United States Patent [19]

Beltz

[11] Patent Number: 4,716,819
[45] Date of Patent: Jan. 5, 1988

[54] HEAT TRANSFER DEVICE FOR USE IN COOKING PIZZAS

[75] Inventor: John D. Beltz, Wichita, Kans.

[73] Assignee: Pizza Hut, Inc., Wichita, Kans.

[21] Appl. No.: 46,666

[22] Filed: May 4, 1987

Related U.S. Application Data

[62] Division of Ser. No. 729,521, May 1, 1985, abandoned.

[51] Int. Cl.[4] ............................................. A47J 37/04
[52] U.S. Cl. ......................................... 99/419; 99/447
[58] Field of Search ............... 99/419, 447, 450, 420, 99/421 R; 426/920; 165/185; 428/66

[56] References Cited

U.S. PATENT DOCUMENTS

| | | | |
|---|---|---|---|
| 937,587 | 8/1909 | Fairbanks | 99/419 |
| 997,653 | 7/1911 | Doersch | 99/419 |
| 1,630,188 | 5/1927 | Knauff | 99/419 |
| 1,728,064 | 9/1929 | Johnson | 99/419 |
| 1,890,907 | 12/1932 | Hoover | 99/419 |
| 2,075,407 | 3/1937 | Schwartzman | 426/523 |
| 2,183,938 | 12/1939 | Lewis | 99/419 |
| 2,404,166 | 7/1946 | Danilla | 165/185 |
| 2,584,295 | 2/1952 | Sanzenbacher | 99/419 |
| 2,651,251 | 9/1953 | Brown | 99/419 |
| 2,835,480 | 5/1958 | Perez | 257/263 |
| 3,280,907 | 10/1966 | Hoffman | 165/185 |
| 3,379,118 | 4/1968 | Perez | 99/419 |
| 3,552,303 | 1/1971 | Parrish | 99/447 |
| 3,584,683 | 6/1971 | Gordon | 165/185 |
| 3,709,141 | 1/1973 | Schwartzstein | 99/343 |
| 3,766,977 | 10/1973 | Pravda et al. | 165/185 |
| 3,820,592 | 6/1974 | Lander | 165/185 |
| 3,996,847 | 12/1976 | Reed | 99/419 |
| 4,012,770 | 3/1977 | Pravda et al. | 165/185 |
| 4,103,192 | 7/1978 | Wendt et al. | 165/185 |
| 4,154,861 | 5/1979 | Smith | 426/523 |
| 4,170,933 | 10/1979 | Meamber | 99/349 |
| 4,217,817 | 8/1980 | Meamber | 99/419 |
| 4,294,168 | 10/1981 | Redhead | 99/494 |
| 4,377,109 | 3/1983 | Brown et al. | 426/523 |
| 4,471,000 | 9/1984 | Brown et al. | 426/523 |
| 4,605,579 | 8/1986 | Armeno et al. | 428/66 |

FOREIGN PATENT DOCUMENTS

| | | | |
|---|---|---|---|
| 3009386 | 9/1981 | Fed. Rep. of Germany . | |
| 27751 | of 1903 | United Kingdom | 99/419 |
| 350610 | 6/1931 | United Kingdom | 99/419 |
| 407414 | 3/1934 | United Kingdom | 165/185 |
| 605497 | 7/1948 | United Kingdom | 99/419 |
| 2008934 | 6/1979 | United Kingdom | 99/419 |
| 2065458 | 7/1981 | United Kingdom | 99/419 |

OTHER PUBLICATIONS

"Preparing for the Show," *Mondays*, Mar. 11, 1985.

*Primary Examiner*—Louis K. Rimrodt
*Assistant Examiner*—J. L. Olds
*Attorney, Agent, or Firm*—Willian Brinks Olds Hofer Gilson & Lione Ltd.

[57] ABSTRACT

The invention is heat transfer device to aid in the cooking of pizzas, particularly thick or double crust pizzas, as well as a method for cooking an assembled pizza with such a device. The device comprises a heat conducting means, preferably made in one piece, which in turn comprises a heat absorbing band portion with heat transferring pins extending therefrom. In the preferred embodiment, the heat conducting means is formed in a spiral with the heat transferring pins extending in a direction perpendicular to the spiral. In another embodiment, the heat conducting means is formed in at least two concentric circles with the heat transferring pins extending in a direction perpendicular to the circles. The method of using the device includes the steps of inserting the heat transferring pins into the pizza before it is cooked and then removing the pins after the pizza is cooked.

22 Claims, 6 Drawing Figures

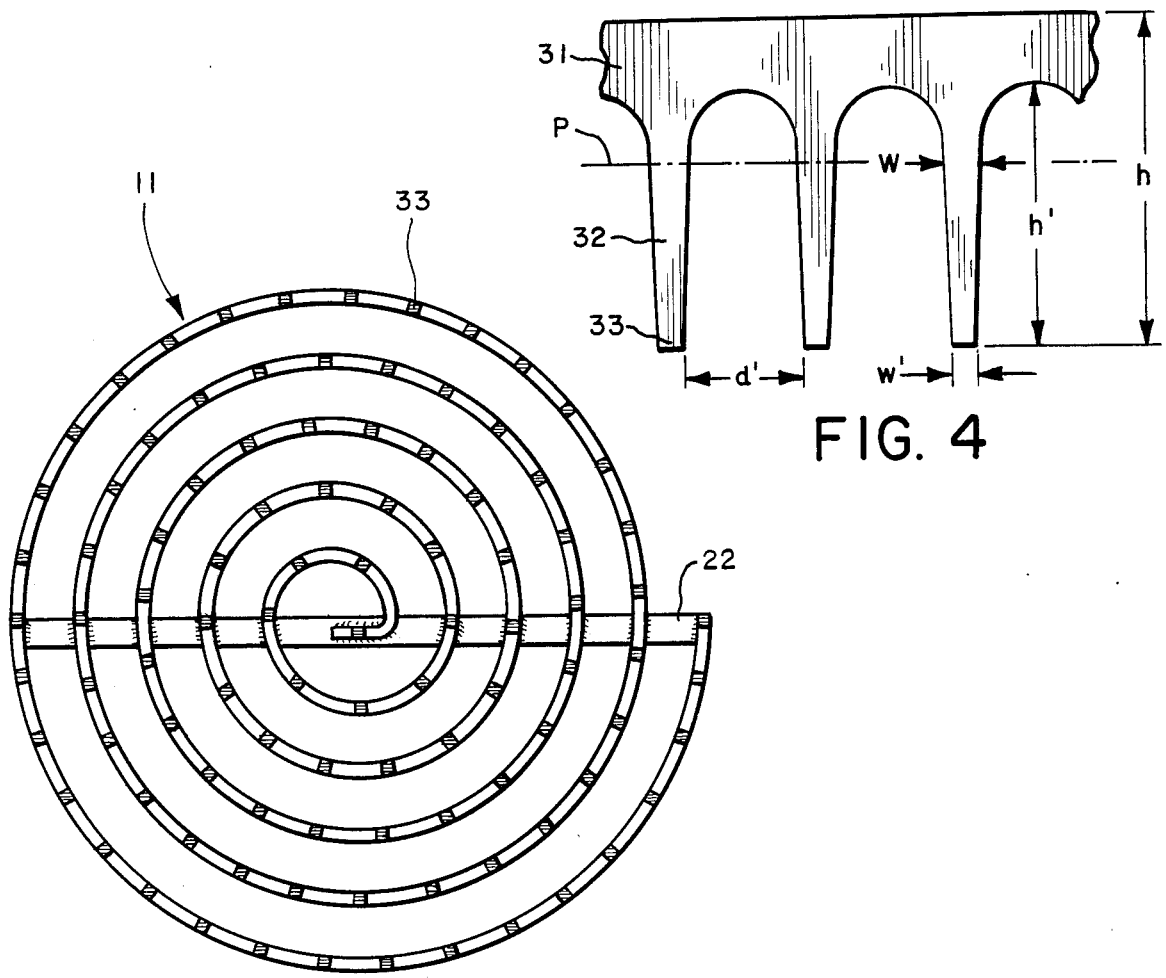
FIG. 4
FIG. 5
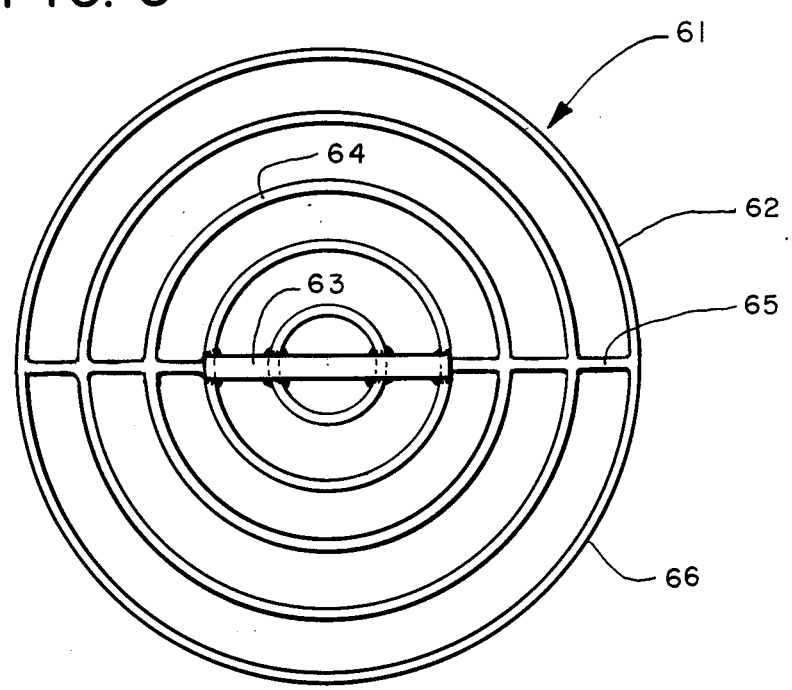
FIG. 6

HEAT TRANSFER DEVICE FOR USE IN COOKING PIZZAS

CROSS REFERENCE TO RELATED APPLICATIONS

The present application is a divisional application U.S. patent application Ser. No. 729,521, filed May 1, 1985, now abandoned.

BACKGROUND OF THE INVENTION

The invention relates to the field of cooking and more particularly to the field of pizza cooking.

In recent years, the art of pizza cooking, particularly in the restaurant setting, has undergone significant changes. For example, the use of convection ovens has reduced the cooking time, thereby improving the efficiency of the commercial pizza cooking process. Likewise, the use of conveyor ovens has improved the consistency of the pizzas so cooked.

Also within recent years, the pizza business has witnessed certain trends in the public's taste for different types of pizza. In particular, the public has developed a taste for thick, or "pan", pizza, as well as for double crust, or "stuffed", pizza. In response, many pizza establishments now offer at least one of these other types in addition to their original or "thin" pizza.

Unfortunately however, this increased variety in the pizza menu has brought particular problems to the pizza restaurants. For one thing, the thick and double crust pizzas are likely to require longer cooking times. This is a problem because of increased energy costs, because customers typically do not want to wait longer times for their pizza, and because of the decreased efficiency of table capacity in a restaurant when it takes longer to service each customer.

Another problem problem often encountered by pizza restaurants offering these different types of pizzas is the necessity of maintaining ovens at different temperatures. This is because these thicker pizzas are often cooked at lower temperatures so the centers of the pizza can be sufficiently heated before the outsides becomes overcooked. This problem is especially severe with the double crust pizza as the relatively low thermal conduction of the top crust acts as a heat barrier to the ingredients below it.

These problems are compounded when the pizza restaurant uses a conveyor oven. That is, both the temperature of the oven and the speed of the conveyor (to effect a longer or shorter cooking time) may have to be changed depending on the type of pizza cooked. For example, the inventors have observed that whereas a typical "thin" pizza can be cooked in a convection conveyor oven set at 500° F. in 8 minutes, a typical double crust pizza requires 14 minutes in the same oven set at 425° F. Thus, the restaurant may either continually make these adjustments or can dedicate an oven to each type of pizza. Naturally, either situation is disadvantageous, particularly to a high volume pizza restaurant where efficiency is critical.

SUMMARY OF THE INVENTION

The present invention is a heat transfer device to aid in the cooking of pizzas, particularly thick or double crust pizzas, as well as a method for cooking an assembled pizza with such a device. Briefly, the heat transfer device comprises a heat conducting means which has a heat absorbing band portion with a plurality of heat transferring pins extending therefrom. Also briefly, the method for cooking a pizza with the device comprises the steps of inserting the heat transferring pins of the device into the pizza before placing it in the oven for cooking and then removing the pins from the pizza after it has been cooked.

In accord with one embodiment of the present invention, the heat conducting means is formed from a single piece of material, preferably aluminum. Also, the heat conducting means is formed in a spiral with all of the heat transferring pins extending in one direction which is perpendicular to the spiral. The pins are spaced at equal distances along the spiral and have a length greater than the depth to which they are to be inserted in the pizza whereby the heat absorbing band portion is prevented from contacting the pizza. the pins are also tapered and coated with a non-stick material to facilitate their removal from the cooked pizza. In addition, a supporting bar is attached across the top of the heat absorbing band portion to help maintain the shape of the heat conducting means and also to provide a handle for inserting and removing the device.

In accord with another embodiment, the heat conducting means is formed in at least two concentric circles with all of the heat transferring pins extending in one direction which is perpendicular to the circles. The heat conducting means in this embodiment is preferably cast as a single piece of aluminum.

BRIEF DESCRIPTION OF THE DRAWINGS

FIG. 4 is an enlarged view showing the configuration of the heat transferring pins of the preferred embodiment.

FIG. 5 is a bottom view of the preferred embodiment showing the spatial arrangement of the heat transferring pins.

FIG. 6 is a top view of an alternate embodiment.

DETAILED DESCRIPTION

Figure 1:
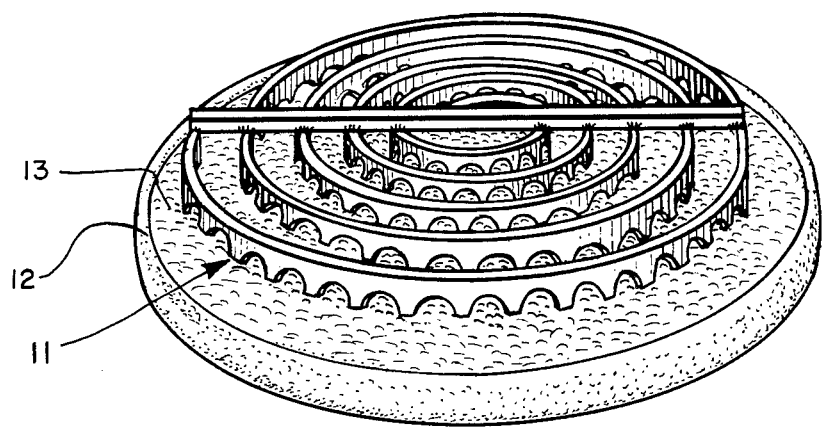
FIG. 1 is a perspective view of the preferred embodiment of the present invention which has been inserted into a pizza.

Referring to the drawings, FIG. 1 shows a heat transfer device 11 made according to the present invention which has been inserted into an assembled pizza 12 before it is placed in an oven to be cooked. It should be noted that the particular composition of the pizza 12 does not form a part of the invention. That is, the pizza can be assembled by any known method. Two requirements for the pizza 12 are that it be assembled and ready to cook at the time the device 11 is inserted, and that it has a top layer 13 which can be pierced by the heat transferring pins 32 (shown in FIG. 3).

Figure 2:
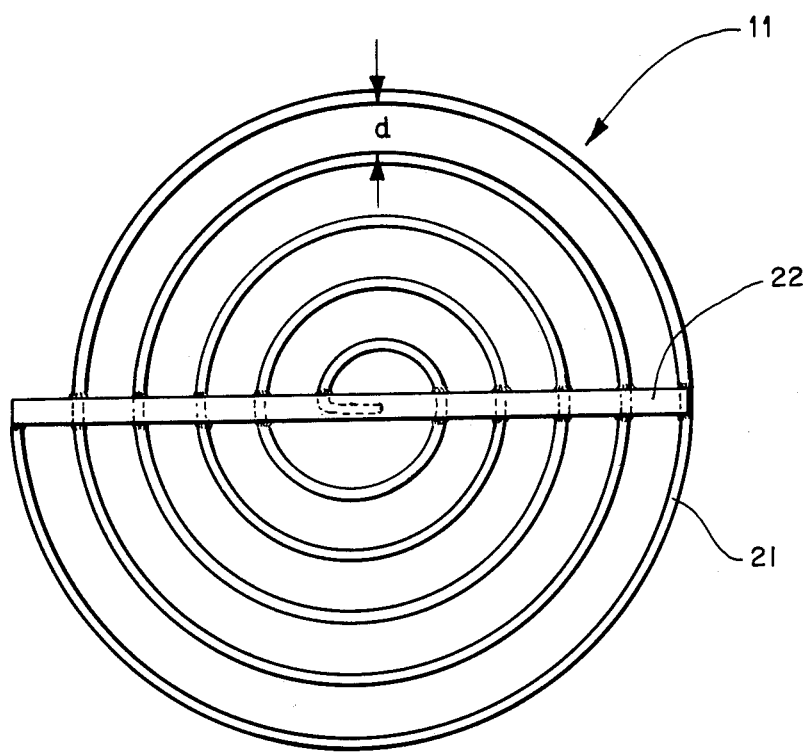
FIG. 2 is a top view of the preferred embodiment.

FIG. 2 is a top view of the preferred embodiment and shows the spiral configuration of the heat conducting means 21 of the device 11. A support bar 22 is attached, preferably by welding, across the top of the conduction means 21 and is used both as a handle for the device 11 and to help retain the configuration of the heat conducting means 21.

As can be seen, the spiral in this preferred embodiment has 5 revolutions which are each spaced apart generally at a uniform distance d. Preferably, the thickness of the heat conducting means 21, i.e. the thickness of both the band portion 31 and the pins 32, is ⅛ inch, and the distance d between each revolution is approximately ⅞ inch. As a result, there is left a majority of open space above the pizza when the device 11 is inserted. The inventors have found this open space above the pizza to be important because it reduces the interference of the device 11 with the proper cooking of the top surface of the pizza, particularly the browning of the cheese.

Figure 3:
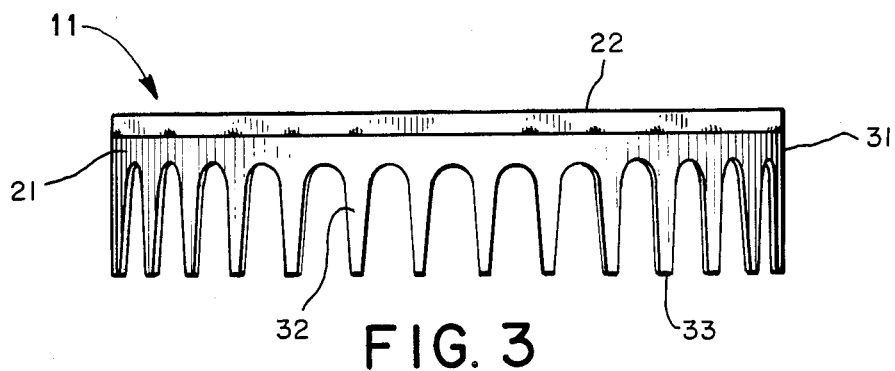
FIG. 3 is a side plan view of the preferred embodiment.

Referring to FIG. 3, it is seen that the heat conducting means 21 comprises a heat absorbing band portion 31 which forms the top part of the means 21, and a plurality of heat transferring pins 32 extending down from the band portion 31. Thus, the pins 32 each extend perpendicularly from the spiral. In this embodiment, all of the pins are of the same length. Accordingly all of the distal ends 33 lie generally in the same plane.

Also, it is most desirable to have the heat absorbing band portion 31 and the heat transferring pins formed from the same piece of material. In other words, it is preferable to have the heat conducting means 21 of one-piece construction. This is beneficial because of the difficulty in attaching the large number of pins 32 needed, particularly in view of the continual subjection of the device 11 to high temperatures followed by rapid cooling. For example, the inventors had difficulty retaining pins which were threaded into a heat absorbing portion. The one-piece construction is also beneficial to the heat conducting properties of the means 21.

FIG. 4 is an enlarged view showing four of the heat transferring pins 32 shown in FIG. 3. As can be seen, each pin 32 is tapered toward its distal end 33. Preferably, the width w measured near the top of the pin is one and one half times greater than the width w' measured at the distal or bottom end 33. In the most preferred embodiment, the width w is 3/16 inch and the width w' is ⅛ inch. This taper is important for two reasons. First it facilitates removal of the pins from the pizza after it is cooked. Second, the taper is beneficial to the heat transferring properties of each pin.

The height h' of each pin 32 is selected so as to allow the device to be properly inserted into the pizza while leaving a portion of the pin outside of the pizza. In this way, the heat absorbing band portion 31 is kept off of the top of the pizza 12 (see FIG. 1). In this preferred embodiment, the pins 32 are designed to be inserted in the pizza to a level p. Thus the portion of the pins 32 above this level p absorb heat from the oven and also keep the heat absorbing band portion 31 well separated from the top of the pizza. This separation is important as it reduces the interference of the device with the cooking of the top surface of the pizza. That is, with this separation, the top of the pizza is not covered and the cheese is allowed to properly brown. Also, when a convection oven is used to cook the pizza, it is extremely important to allow the forced hot air to circulate as freely as possible over the top of the pizza. Thus, the space between the band portion 31 and the pizza as well as the space between the revolutions of the spiral are highly desirable.

Another important dimension for the heat transfer device 11 is the overall height h. Typically pizza ovens, especially conveyor pizza ovens, have slots of limited height in which the pizza must fit. It has been found that a device 11 with a total height h of 2 and ⅛ inches fits into many conveyor ovens.

In this preferred embodiment, the top of each pin 32 fans out so that the surface between the main portion of adjacent pins can be described as a semicircle. Preferably, the radius of this semicircle is ⅜ inch. This configuration is desirable for two reasons. First, it allows each pin 32 to have a large area of contact with the heat absorbing band portion 31. Second, it avoids the occurrence of sharp corners between the pins 32 and the band portion 31. This avoidance is important for sanitation reasons. That is, whenever dealing with food handling apparatus, it is important to avoid sharp corners because it is naturally more difficult to prevent food and debris attachment in corners. For similar reasons, the supporting bar 22 is carefully attached so as to avoid gaps between it and the conducting means 21, which gaps could cause sanitation problems. Likewise, this is another reason why it is preferable to form the heat conducting means in one piece.

The pins 32 are spaced along the spiral at a generally uniform distance d'. Preferably, this distance d' is equal to the distance d between each revolution of the spiral, which as stated is preferably ⅞ of an inch. This results in placing the pins on approximately one inch centers. Naturally, because the radius of curvature changes along the spiral, the actual linear distance between the pins will vary. That is, the pins near the center of the spiral will be closer together.

FIG. 5, which is a bottom view of this preferred embodiment, shows the spatial relationship achieved when the pins are on one inch center along the spiral with each revolution being separated also on one inch centers. In this particular embodiment, there are about 96 pins. As can be seen, this spiral configuration, i.e. with equal distances between pins along the spiral and between the revolutions of the sprial, provides a relatively uniform spacing of the pins. Naturally, this is a desirable condition for even cooking of the pizza.

Another advantage of the spiral configuration of the preferred embodiment is the fact that different sizes of heat transfer devices can be readily made by simply including fewer or more revolutions of the spiral. The particular embodiment depicted here, i.e. with five revolutions and resulting in a maximum diameter of of 11 and ¼ inches, is suitable for cooking the typical large, i.e. 14 inch, pizza. A device for a medium pizza is made with four revolutions, while a device for a small pizza is made with only three revolutions. Also, the spacing between the revolutions can be adjusted to produce different sizes.

The preferred material for the heat conducting means 21 is aluminum or an alloy of aluminum. This is so because of aluminum's relatively high thermal conductivity. Most preferably, the aluminum alloy used is that sold by KAISER under the designation of "5052". This particular alloy is selected because of its relatively high strength remaining after it has been subjected to high temperatures.

It is desirable to coat the heat transferring pins 32 with a non-stick material in order to facilitate insertion and removal of the pins 32 from the pizza. Preferably, this coating consists of a fluoropolymer coating such as Teflon ® or Silverstone ® both of which are manufactured and sold by DuPONT. Silverstone ® is most preferred in that it appears to present the most durable surface. The method used to coat the pins 32 in this embodiment is that prescribed by DuPONT, from whom the details can be readily acquired. Briefly, the entire device is grit blasted after which a cleaning solution may be applied. A primer coat is then applied by spraying and allowed to dry. The device is then sprayed with an intermediate coat after which the top coat is sprayed on. Next, the device is baked in an oven at about 700° F. for 3 to 5 minutes. The device is then cooled and a second layer of top coat is applied which is cured at 800° F. for 3 to 5 minutes. The resultant coating is approximately 0.0017 inch thick.

FIG. 6 shows a heat transfer device 61 made according to an alternative embodiment of the present invention. In this embodiment, the heat conducting means 62 is cast, preferably die cast, into concentric circles 64 which are spaced apart by bridging sections 65. Most preferably, for cooking a large pizza, the heat conducting means 62 comprises five circles 64 which are spaced about 1 inch from adjacent circles. The inner circle has a diameter of about 1 and ½ inches while the outer circle has a diameter of about 9 and ½ inches. In addition, a gripping bar 63 is included which is attached across the tops of the two innermost circles.

In this embodiment, the heat transfer pins (not shown) are preferably generally cylindrical with a taper toward the bottom ends. Also, the heat absorbing portions 66 are rounded around the top and bottom sides. The preferred material for this cast embodiment is 380 aluminum.

A method for cooking a pizza with the heat transfer device can be described as follows. First, an assembled pizza is obtained. Methods for assembling pizza, whether thin, thick, or double crust, are well known in the art. A thick, or "pan", pizza typically has a crust which is about ½ inch thick with a ½ inch layer of sauce, meat and/or vegetables, and cheese on top. A double crust, or "stuffed", pizza typically has a bottom crust which is about 3/16 inch thick. On top of that is a layer of sauce, meat and/or vegetables, and cheese, which is typically about ½ inch thick. Next the upper crust which is similar in thickness to the lower crust, is added. Finally, a layer about 3/16 inch thick of cheese and sauce is placed on top of the upper crust. The description of these types of pizza are given as examples of typical pizzas only. Clearly, it is within the scope of the invention to use the device on pizzas of other construction.

The heat transferring pins are inserted into the pizza before it is placed in the oven to cook. This is accomplished by centering the device over the pizza after which the device is pushed straight down into the pizza. When cooking a thick pizza, the pins are preferably inserted all the way through the sauce, meat/vegetable, and cheese layer so that they rest on top of the crust. When cooking a double crust pizza, the pins are preferably inserted through the top layer of cheese and sauce, through the top crust, through the bottom layer of sauce, meat/vegetables, and cheese, and rest on top of the bottom crust. Alternatively, it has been found that it is not detrimental to insert the pins into the bottom crust. However, as mentioned, the pins should be long enough so that the heat absorbing portion, i.e. the portion which extends between the pins, does not touch the top of the pizza.

It is desirable to remove the heat transfer device immediately after the pizza is taken from the oven. This is important in preventing excessive sticking of the ingredients of the pizza on the pins. Particularly, it has been found that it is best to remove the pins when the cheese is at its hottest and is therefore most liquid. It is also desirable to lift the device straight up from the pizza. Likewise, it is desirable to make sure the pins remain straight, i.e. that they all point straight down. Otherwise, sticking is more likely to occur. After removal, any food sticking on the pins should be cleaned off.

It was a somewhat surprising result to find that when this method is properly performed there is a minimum of sticking problems. That is, it was expected that the ingredients would stick to the pins after cooking. However, the inventors have found that when the pins are tapered, coated with a good non-stick surface, and are kept pointing straight down, the pins come out substantially clean after the pizza is cooked.

As an example of the method for cooking a pizza with the device of the present invention, a heat transfer device as described above in connection with the preferred embodiment was inserted into a typical double crust pizza. The double crust pizza was made as described above and had a total thickness of about 1 and ¼ inches. The pins were inserted far enough to rest on top of the bottom crust. The pizza and device were then placed in a conveyor oven set at 500° F. and a conveyor rate set to cook the pizza for 8 minutes. The pizza exited the oven and the device was promptly removed. There was only slight food attachment to the pins. The pizza was well cooked. In particular, the cheese was properly browned on top, the crusts were fully cooked, and the inside ingredients reached a temperature of 170° to 180° F.

This example of cooking a double crust pizza with a device of the present invention can be contrasted with an example of cooking the same type of double crust pizza without the device. In the latter example, the oven had to be set to 425° F. to avoid burning the top cheese and the conveyor was set for a cooking time of 14 minutes. The inside ingredients only reached a temperature of about 155° F.

It should be noted that although much of the discussion has dealt with cooking double crust or thick pizzas, it is also possible to cook a thin pizza with the device of the invention. Likewise, although much of the discussion has dealt with the cooking of pizzas in convection and/or conveyor ovens, the device is not limited to being used with such ovens. In general, it is to be born in mind that the above description of the specific embodiments should be interpreted as exemplary and explanatory rather than limiting. Certainly, it is the following claims which define the scope of the present invention.

What is claimed is:

1. A device for use in cooking a pizza which comprises a one-piece heat conducting means with a heat absorbing band portion and with a plurality of heat transferring pins extending from the heat absorbing band portion of inserting into the pizza.

2. A device for use in cooking a pizza which comprises a heat conducting means with a heat absorbing band portion and with a pluraltiy of heat transferring pins extending from the heat absorbing band portion for inserting into the pizza, the heat conducting means being formed generally in a spiral with the heat transferring pins extending in a direction generally perpendicular to the spiral.

3. The device of claim 2 further comprising a supporting bar which is attached to the heat conducting means in at least two places.

4. The device of claim 2 wherein the heat conducting means is formed in a single piece.

5. The device of claim 2 wherein the heat transferring pins have a length such that when the pins are inserted into the pizza a portion of each pin remains outside of the pizza thereby preventing the heat absorbing band portion from contacting the pizza.

6. The device of claim 2 wherein the heat absorbing band portion has a thickness similar to that of the heat transferring pins.

7. The device of claim 2 wherein the heat conducting means is formed from a material selected from the group consisting of aluminum and aluminum alloys.

8. The device of claim 2 wherein the heat transferring pins are spaced at generally equal distances along the spiral.

9. The device of claim 2 wherein the heat transferring pins are tapered such that each has a width at the end distal from the heat absorbing band portion which is less than a width at the end proximate to the heat absorbing band portion.

10. The device of claim 2 wherein the spiral comprises at least two revolutions which are separated by a generally unifrom distance.

11. The device of claim 2 wherein the heat transferring pins are coated with a non-stick material.

12. A device for use in cooking a pizza which comprises a one-piece heat conducting means which is formed generally in a spiral with at least two revolutions and which means comprises a heat absorbing band portion with tapered heat transferring pins for inserting into the pizza extending from the heat absorbing band portion in a direction generally perpendicular to the spiral, the heat transferring pins having a length such that when the pins are inserted into the pizza a portion of each pin remains outside of the pizza thereby preventing the heat absorbing band portion from contacting the pizza, the device further comprising a supporting bar which is attached to the heat conducting means.

13. A device for use in cooking a pizza which comprises a heat conducting means with a heat absorbing band portion and with a plurality of heat transferring pins extending from the heat absorbing band portion for inserting into the pizza, the heat conducting means being formed in at least two concentric circles with the heat transferring pins extending in a direction generally perpendicular to the circles.

14. The device of claim 13 wherein the heat transferring pins have a length such that when the pins are inserted into the pizza a portion of each pin remains outside of the pizza thereby preventing the heat absorbing band portion from contacting the pizza.

15. The device of claim 13 wherein the heat absorbing band portion has a thickness similar to that of the heat transferring pins.

16. The device of claim 13 wherein the heat transferring pins are tapered such that each has a width at the end distal from the heat absorbing band portion which is less than a width at the end proximate to the heat absorbing band portion.

17. The device of claim 13 wherein the heat transferring pins are generally cylindrical with a taper such that each has a diameter at the end distal from the heat absorbing band portion which is less than the diameter at the end proximate to the heat absorbing band portion.

18. The device of claim 13 wherein the heat conducting means is formed from a material selected from the group consisting of aluminum and aluminum alloys.

19. The device of claim 13 wherein the heat transferring pins are spaced at generally equal distances along the circles.

20. The device of claim 13 further comprising a supporting bar which is attached to at least one of the circles.

21. The device of claim 13 wherein the heat transferring pins are coated with a non-stick material.

22. A device for use in cooking a pizza which comprises a one-piece heat conducting means which is formed in at least two concentric circles and which means comprises a heat absorbing band portion with tapered heat transferring pins for inserting into the pizza extending from the heat absorbing band portion in a direction generally perpendicular to the circle, the heat transferring pins having a length such that when the pins are inserted into the pizza a portion of each pin remains outside of the pizza thereby preventing the heat absorbing band portion from contacting the pizza.

* * * * *

UNITED STATES PATENT AND TRADEMARK OFFICE
CERTIFICATE OF CORRECTION

PATENT NO. : 4,716,819
DATED : January 5, 1988
INVENTOR(S) : John D. Beltz

It is certified that error appears in the above-identified patent and that said Letters Patent is hereby corrected as shown below:

DETAILED DESCRIPTION

In column 2, line 61, please delete "conduction" and substitute --conducting-- therefor.

In column 4, line 28, please delete "center" and substitute --centers-- therefor.

IN THE CLAIMS

In column 6, line 52, please delete "of" and substitute --for-- therefor.

Signed and Sealed this

Eleventh Day of September, 1990

Attest:

HARRY F. MANBECK, JR.

Attesting Officer  Commissioner of Patents and Trademarks